United States Patent [19]

Nogami

[11] Patent Number: 5,091,115
[45] Date of Patent: Feb. 25, 1992

[54] SEMICONDUCTOR-CONTAINING GLASS AND METHOD FOR PRODUCING SAME

[75] Inventor: Masayuki Nogami, 92-10, Yakato-cho, Seto-shi, Aichi-ken, Japan

[73] Assignees: Hoya Corporation, Tokyo; Masayuki Nogami, Aichi, both of Japan

[21] Appl. No.: 506,784

[22] Filed: Apr. 10, 1990

[30] Foreign Application Priority Data

Apr. 17, 1989 [JP] Japan ................................ 1-96889

[51] Int. Cl.$^5$ ................................................ C03C 3/04
[52] U.S. Cl. ......................................... 252/518; 252/520; 501/10; 501/32; 501/56; 501/68; 501/54; 501/12
[58] Field of Search ........................ 501/10, 12, 32, 56, 501/68, 54; 252/518, 520

[56] References Cited

U.S. PATENT DOCUMENTS

| | | | |
|---|---|---|---|
| 3,607,789 | 9/1971 | Murthy et al. | 501/32 X |
| 4,000,998 | 1/1977 | Rittler | 501/10 X |
| 4,264,679 | 4/1981 | Panzarino et al. | 501/17 X |
| 4,657,699 | 4/1987 | Nair | 501/32 X |
| 4,814,298 | 3/1989 | Nelson et al. | 501/32 X |

*Primary Examiner*—Karl Group
*Attorney, Agent, or Firm*—Nixon & Vanderhye

[57] ABSTRACT

A semiconductor-containing glass having a high nonlinear optical effect is provided which comprises a glass matrix mainly composed of $SiO_2$ wherein said glass matrix contains a semiconductor microcrystal having a particle size of less than 100Å.

This semiconductor-containing glass is produced by a method which comprises subjecting a solution containing a metal alkoxide containing at least a silicon alkoxide as well as a semiconductor having a particle size of less than 100Å, to hydrolysis reaction to obtain a gelled solid and heating the resulting gelled solid to 400°–1300° C. to form a glass or a method which comprises subjecting a solution containing a metal alkoxide containing at least a silicon alkoxide as well as a metal salt which becomes semiconductor upon decomposition, to hydrolysis reaction to obtain a gelled solid; heating the gelled solid to 400°–1300° C. to form a glass; and simultaneously with or after the heating to 400°–1300° C., reacting the gelled solid or the glass with a gas containing an atom which reacts with a metal element in said metal salt to provide a semiconductor, thereby to precipitate a semiconductor microcrystal having a particle size of less than 100Å.

2 Claims, No Drawings

SEMICONDUCTOR-CONTAINING GLASS AND METHOD FOR PRODUCING SAME

BACKGROUND OF THE INVENTION (1) Field of the Invention

The present invention relates to a semiconductor-containing glass having a high nonlinear optical effect which can be used in the fields of optical information, for example, as optical switch and optical wavelength transformation element, and a method for producing same.

(2) Description of Prior Art

As materials having a high nonlinear optical effect, there are used those which are formed by alternately laminating semiconductors such as GaAs and AlGaAs of several ten Å in thickness. In a thin film material comprising laminated semiconductors, a quantum size effect by which electrons and holes are configured in layers is exhibited by making the thickness of each layer to less than several ten Å and thus a high nonlinear susceptibility is obtained. Since such thin film material has the structure comprising a substrate on which semiconductors are laminated, electrons and holes are merely confined in one dimensional direction of laminate. If semiconductor can be confined three-dimensionally in a matrix, it is expected that higher nonlinear susceptibility can be obtained.

As materials in which semiconductor is three-dimensionally confined, those which are produced by incorporating semiconductor microcrystal in a multi-component glass, have been noticed recently. A representative example of such glass is one which contains less than about 1% of $CdS_xSe_{(1-x)}$ micro-crystal and this is commercially available as filter glass. Such glass is produced by mixing CdS and Se with glass raw materials such as silica sand, soda ash, alumina, zinc oxide, etc., melting the mixture with heat to prepare a glass in which $Cd^{2+}$, $S^{2-}$ and $Se^{2-}$ are uniformly dispersed in the form of ion, and reheating this glass at 600°-700° C. to precipitate $CdS_xSe_{(1-x)}$ crystal.

A glass containing CuCl crystal is also produced in addition to the glass containing $CdS_xSe_{(1-x)}$ crystal. In this case, preparation of glass by melting raw materials and precipitation of CuCl crystal by reheating treatment are the same as those for production of the glass containing $CdS_xSe_{(1-x)}$ crystal.

When a glass containing semiconductor crystal is produced by the above method, firstly a uniform glass must be prepared by melting glass raw materials. However, since solubility of CdS and Se in glass melt is low, a glass containing a large amount of CdS and Se cannot be produced. Furthermore, S and Se readily volatilize at high temperature and selective volatilization of these elements occur during production of glass. Therefore, contents of S and Se in the glass decrease. Besides, control of the contents is not easy. For these reasons, content of $CdS_xSe_{(1-x)}$ crystal is merely less than 1% and as a result, the glass is low in nonlinear susceptibility and is not effective as nonlinear optical material.

Furthermore, in order to inhibit volatilization of S and Se, melting temperature of glass must be lowered and thus, composition of glass is limited to multi-component glass in which content of $SiO_2$ is reduced to 70% or less. Therefore, the resulting glass is low in strength and durability as glass material and lacks reliability.

SUMMARY OF THE INVENTION

In order to solve these problems in the conventional techniques, the inventor has conducted intensive research in an attempt to find a glass containing semiconductor micro-crystal at high concentration and a method for producing such glass. As a result, it has been found that a glass containing semiconductor microcrystal having a particle size of less than 100 Å at a high concentration can be obtained by the method (A) which comprises subjecting a solution containing a metal alkoxide and a semiconductor having a particle size of less than 100 Å, to hydrolysis reaction to obtain a gelled solid and then heating the gelled solid at a temperature of 400°-1300° C. to form a glass or the method (B) which comprises subjecting a solution containing a metal alkoxide and a metal salt which decomposes to become a semiconductor, to hydrolysis reaction to obtain a gelled solid; heating the gelled solid at a temperature of 400°-1300° C. to form a glass; and simultaneously with or after the heating to 400°-1300° C., reacting the gelled solid or the glass with a gas containing an atom which reacts with a metal element in said metal salt to provide a semiconductor, thereby to precipitate a semiconductor microcrystal having a particle size of less than 100 Å.

According to the present invention, there are provided:

(i) A semiconductor-containing glass which comprises glass matrix mainly composed of $SiO_2$ wherein said glass matrix contains a semiconductor micro-crystal having a particle size of less than 100 Å.

(ii) A method for producing a semiconductor-containing glass which comprises subjecting a solution comprising a metal alkoxide containing at least a silicon alkoxide as well as a semiconductor having a particle size of less than 100 Å, to hydrolysis reaction to obtain a gelled solid and heating the resulting gelled solid at a temperature of 400°-1300° C. to form a glass.

(iii) A method for producing a semiconductor-containing glass which comprises subjecting a solution comprising a metal alkoxide containing at least a silicon alkoxide as well as a metal salt which becomes a semiconductor upon decomposition, to hydrolysis reaction to obtain a gelled solid; heating the gelled solid at a temperature of 400°-1300° C. to form a glass; and simultaneously with or after the heating to 400°-300° C., reacting the gelled solid or the glass with a gas containing an atom which reacts with metal element in said metal salt to provide semiconductor, thereby to precipitate a semiconductor microcrystal having a particle size of less than 100 Å.

DESCRIPTION OF THE INVENTION

The semiconductors used in the present invention include compound semiconductors such as, for example, CdS, CuCl and PbS. As starting materials therefor, there may be used these semiconductors as they are, or nitrates, acetates, halides and the like of metals such as Cd, Cu and Pb which can be dissolved in solvents such as alcohol and acetanilide.

Content of the semiconductor in glass is preferably 1-15 mol %. This is because if content of the semiconductor exceeds 15 mol %, the glass which is homogeneous and transparent cannot be obtained and if it is less than 1 mol %, the glass is not suitable as a nonlinear optical material owing to the low content. Main component of the matrix glass is $SiO_2$ and content thereof is preferably at least 85 mol % when the glass does not contain other metal oxides which improve strength and durability of glass. Employment of $SiO_2$ content of at least 85 mol % results in a material superior in strength and durability. However, when in addition to $SiO_2$, the glass contains other metal oxides such as $Al_2O_3$, $TiO_2$, $B_2O_3$ and $ZrO_2$ which improve strength and durability of glass, $SiO_2$ content may be 60 mol % or above. As raw materials for these metal oxides, corresponding alkoxides (such as an aluminum alkoxide, a titanium alkoxide, a boron alkoxide and zirconium alkoxide) may be used.

According to the sol-gel method which uses metal alkoxides as raw materials, even a glass having high melting point which cannot be produced by the melting method which is a conventional glass production method, for example, a glass which contains $SiO_2$ as a main component can also be produced at relatively low temperatures. Thus, it is one of the advantages of the present invention that glass having a high nonlinear optical effect with high strength and excellent durability which cannot be obtained by the melting method can be obtained.

According to the present invention, a solution of a metal alkoxide and a semiconductor at a given mixing ratio is subjected to hydrolysis reaction to form a gelled solid. The hydrolysis is usually carried out by adding water to the metal alkoxide-containing solution and stirring the solution. It is also possible to firstly subject a solution of silicon alkoxide which is low in hydrolysis rate to hydrolysis reaction, followed by adding thereto a solution of other metal alkoxide(s) and semiconductor, and then further adding water to carry out hydrolysis. Amount of water necessary for the hydrolysis may be about twice the mol of the metal alkoxide used, but hydrolysis time can be shortened by using water of more than the above amount.

Reaction time can be shortened by adding an acid such as HCl, $HNO_3$ or the like or a base such as $NH_4OH$, NaOH or the like as a catalyst. Amount of the catalyst may be about 0.01-0.4 mol.

The hydrolysis proceeds at room temperature, but the reaction time can further be shortened by heating to about 40°-80° C. However, a temperature higher than 80° C. is not preferred because at such temperature there may occur rapid evaporation of solvent (e.g. alcohol) and water and partial evaporation of unhydrolyzed metal alkoxide.

The product obtained by the hydrolysis is a slurry or a solid, which is dried to obtain a dry gel. Drying time which may depend on amount of remaining water or drying temperature is usually about 10-100 hours. Thereafter, the temperature is gradually raised finally to 150° C. to obtain a gelled solid having a low residual water content. When heating rate is increased, rapid shrinkage of gel occurs and there is the possibility to rupture the gel and hence the heating is usually carried out at 10° C./hour or less.

Subsequently, the gelled solid is converted to glass by heating. Heating temperature is 400°-1300° C. If heating temperature is lower than 400° C., vitrification is not sufficient and besides, water or organic matters remain in a large amount. If higher than 1300° C., glass matrix is crystallized or semiconductor crystal becomes coarse and as a result a glass containing microcrystal aimed at by the present invention cannot be obtained. Size of semiconductor crystal depends on heating temperature and time, and heating at higher temperature for a longer time results in larger semiconductor crystal.

As a result of the above procedure, a glass containing semiconductor microcrystal of less than 100 Å in particle size can be obtained. In the case of using, as a raw material, a metal salt such as acetate, nitrate or halogenide of a metal constituting the semiconductor, during or after heating the resulting gelled solid to 400°-1300° C. to form a glass, the gelled solid or the glass is reacted with a gas such as $H_2S$ or HCl which contains an atom which reacts with a metal element in said metal salt to provide a semiconductor, whereby semiconductor microcrystal having a particle size of less than 100 Å is formed. The gas used depends on the composition of semiconductor and, for example, when sulfide crystal such as CdS or PbS is allowed to be contained, $H_2S$ is used as the gas and when chloride crystal such as CuCl or AgCl is used, HCl gas is used. Since size of the resulting crystal depends on partial pressure of gas, temperature and time, crystal of desired size can be obtained by controlling these factors.

The present invention will be further described by the following examples.

EXAMPLE 1

354 3 g of $Si(OC_2H_5)_4$ was gradually added dropwise to a mixed solution of 30.7 g of 0.15 mol/l HCl solution and 78.3 g of $C_2H_5OH$ with stirring. After completion of addition of $Si(OC_2H_5)_4$, stirring was carried out for further 1 hour to obtain a solution (A). Separately, solution (B) was prepared by dissolving 9.05 g of $Cd(CH_3COO)_2.2H_2O$ in 50 g of $CH_3OH$ and this solution (B) was added to the solution (A), followed by stirring for 1 hour. Thereafter, thereto was added a mixed solution (C) of 78.3 g of $C_2H_5OH$ and 122.6 g of 0.15 mol/l $NH_4OH$ solution and the resulting mixture was stirred for 1 hour. Thereafter, the mixture was put in a container made of polystyrene or tetrafluoroethylene and left stand therein. With proceeding of hydrolysis, excess water and alcohol were volatilized to obtain a gelled solid. This gel was heated at 500° C. for 2 hours and then was left for 1 hour at this temperature in $H_2S$ gas of 1 atm. to obtain a CdS-containing glass. This glass comprised 2 mol % of CdS and 98 mol % of $SiO_2$. According to X-ray diffraction of this glass, only CdS crystal was recognized and no other crystals were present. The size of the CdS crystal was about 40 Å. The value of energy gap obtained from absorption edge of optical absorption spectrum of this glass was 2.6 eV (measuring temp.=room temp.) and this value was higher by 0.2 eV than the value of energy gap of large single crystal (2.4 eV). Thus, it was seen that a large quantum size effect appeared.

EXAMPLES 2-6

Semiconductor-containing glasses as shown in Table 1 were produced in the same manner as in Example 1 except that content of CdS and/or heating temperature were changed. Temperature at the production and energy gap of the resulting semiconductor-containing glasses are also shown in Table 1. It can be seen from Table that all of the semiconductor-containing glasses had high energy gap and a quantum size effect appeared.

TABLE 1

| Example | Glass composition (%) CdS | Glass composition (%) SiO$_2$ | Temperature (°C.) | Energy gap (eV) | Particle size of semiconductor (Å) |
| --- | --- | --- | --- | --- | --- |
| 2 | 2 | 98 | 700 | 2.75 | 32 |
| 3 | 5 | 95 | 500 | 2.55 | 44 |
| 4 | 5 | 95 | 700 | 2.72 | 33 |
| 5 | 10 | 90 | 700 | 2.56 | 43 |
| 6 | 15 | 85 | 700 | 2.50 | 51 |

EXAMPLE 7

A glass comprising a matrix composed of SiO$_2$ end Al$_2$O$_3$ and containing CdS as a semiconductor was produced. Production method was the same as in Example 1 and after hydrolysis of Si(OC$_2$H$_5$)$_4$, Al(OC$_4$H$_8$)$_3$ was added and hydrolysis was carried out. Composition of the resulting glass matrix comprised 32 mol % of Al$_2$O$_3$ and 66 mol % of SiO$_2$ and contained 2 mol % of CdS. The size of the CdS crystal was about 33 Å. Energy gap of this glass was 2.75 eV (measuring temp.=-room temp.) and it is clear that a quantum size effect appeared.

EXAMPLE 8

SiO$_2$ glass containing 2 mol % of CuCl was produced in the same manner as in Example 1 except that CuCl was used. The size of the CuCl crystal was about 40 Å. Energy gap of the resulting glass was 3.26 eV (measuring temp.=77° K.), which was higher by 0.04 eV than that of large CuCl single crystal (3.22 eV) and it is clear that a quantum size effect appeared.

EXAMPLE 9

9.05 g of Cd(CH$_3$COO)$_2$.2H$_2$O was dissolved in 500 g of CH$_3$OH and then reacted with H$_2$S gas with stirring to obtain solution (1) containing CdS fine particles. Separately, solution (2) was prepared by hydrolyzing 354.3 g of Si(OC$_2$H$_5$)$_4$ with a mixed solution of 30.7 g of 0.15 mol/l HCl solution and 78.3 g of C$_2$H$_5$OH. To the resulting solution (2) was added the above solution (1), followed by further stirring for 1 hour. Thereto was added a mixed solution (3) of 78.3 g of C$_2$H$_5$OH and 122.6 g of 0.1 mol/l NH$_4$OH solution to further carry out hydrolysis. The reaction mixture was put in a container and dried to obtain a gelled solid. This gel was heated at 700° C. under a N$_2$ gas atmosphere for 2 hours to obtain a CdS-containing glass.

This glass comprised 2 mol % of CdS and 98 mol % of SiO$_2$. According to X-ray diffreaction of the glass, only CdS crystal was recognized and no other crystals were present. The size of the CdS crystal was about 60 Å. Energy gap of this glass obtained from absorption edge of optical absorption spectrum was 2.5 eV (measuring temp.=room temp.), which was higher by 0.1 eV than that of a large single crystal (2.4 eV). Thus, it was seen that a high quantum size effect appeared.

As explained above, since the semiconductor-containing glass of the present invention contains a semiconductor microcrystal of less than 100 Å in particle size in glass matrix mainly composed of SiO$_2$, it is high in confining effect for semiconductor and is also high in durability and can be used as nonlinear optical materials. This semiconductor-containing glass is produced by the sol-gel method and hence, control of size and amount of semiconductor microcrystal is easy and besides, the raw materials need not be heated at high temperatures and once made to a melt as in the conventional method. Thus, saving of energy at production of glass can be attained and furthermore, generation of toxic gas can be inhibited.

What is claimed is:

1. A semiconductor-containing glass which comprises a glass matrix containing at least 85 mol % SiO$_2$ wherein said glass matrix contains from 1 to 15 mol % of a semiconductor micro-crystal having a particle size of less than 100 Å and said semiconductor is selected from the group consisting of CdS, CuCl and PbS.

2. A semiconductor-containing glass which comprises a glass matrix containing SiO$_2$ and other metal oxides selected from the group consisting of Al$_2$O$_3$, TiO$_2$, B$_2$O$_3$ and ZrO$_2$, the SiO$_2$ content being at least 60 mol % wherein said glass matrix contains from 1 to 15 mol % of a semiconductor microcrystal having a particle size of less than 100 Å, said semiconductor being selected from the group consisting of CdS, CuCl and PbS.

* * * * *